Oct. 27, 1964    M. D. CANNING    3,153,974
METHOD OF AND DEVICE FOR INDICATING A PREDETERMINED
PRESSURE EXERTED BY A FASTENER
Filed April 26, 1961
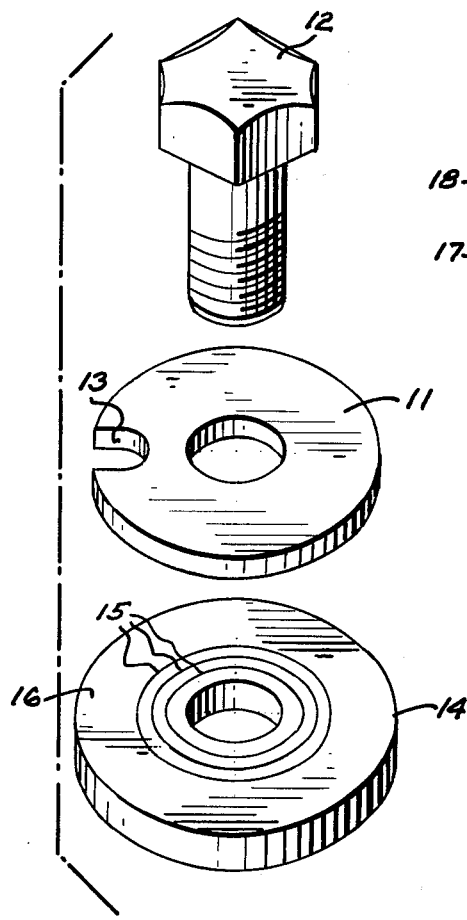
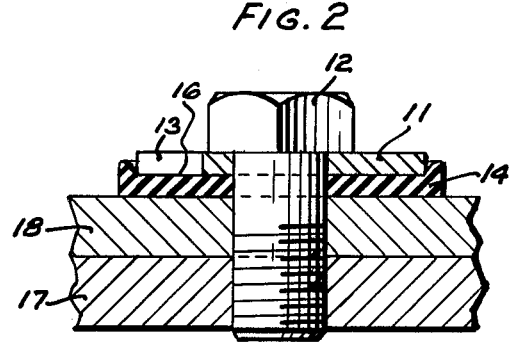
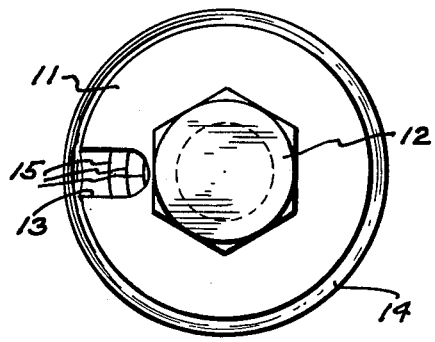
INVENTOR
M. D. CANNING
BY J. L. Landis
ATTORNEY United States Patent Office 3,153,974
Patented Oct. 27, 1964

3,153,974
METHOD OF AND DEVICE FOR INDICATING A PREDETERMINED PRESSURE EXERTED BY A FASTENER
Maurice D. Canning, Wheaton, Ill., assignor to Western Electric Company, Incorporated, New York, N.Y., a corporation of New York
Filed Apr. 26, 1961, Ser. No. 105,708
6 Claims. (Cl. 85—62)

The present invention relates generally to methods of and devices for indicating when a predetermined pressure has been exerted by a fastener as it is driven into a receiving element, and more particularly to methods of and devices for visually indicating the pressure exerted by a threaded fastener as it is screwed into a receiving element. Accordingly, the general objects of the invention are to provide new and improved methods and devices of this character.

It is often desirable that a threaded fastener be tightened in a receiving element to a predetermined pressure that will hold the connected members securely, but will rupture neither the connected members nor the threads of the fastener itself. It is particularly desirable to tighten a fastener to a predetermined pressure when the member to be secured is the lid of a pressure vessel. The pressure within such a vessel at which the connected members will separate becomes very critical in determining the pressure to which the fastener must be tightened. In any case, the pressure exerted by the fastener on the connected members and on the threads of the fastener should be measured, rather than the torsional shear exerted on the fastener shaft. This pressure is the critical parameter, since it is this pressure that holds the connected members securely and it is this pressure that causes the connected members and the threads of the fastener to rupture first.

Accordingly, more specific objects of the invention are to provide new and improved methods of and devices for indicating the pressure exerted by a fastener on the connected members and the threads of the fastener.

In the past, a conventional torque wrench was used to measure the torque applied on a fastener. Although the torque wrench provided a direct indication of the torsional shear in the shaft of the fastener, it failed to indicate the most critical parameter—the pressure exerted by the fastener on the connected elements and on the threads of the fastener itself. In addition, the torque wrench was somewhat cumbersome to handle and had to be substituted for a conventional wrench when the fastener was tightened to the desired torque. Also, since force had to be exerted on the torque wrench while the indicating needle was watched, it was very difficult to read the indicated torque accurately. This difficulty in observing the torque indicated could also be attributed to the transient nature of the indication, since torque would be indicated only so long as force was exerted on the torque wrench.

Therefore, another object of the invention is to provide an improved method of tightening a fastener to a predetermined pressure that will allow the same wrench to be used for both screwing the fastener and tightening the fastener to the desired predetermined pressure in the receiving element.

Another object of the invention is to provide an improved method of and device for visually indicating when a predetermined pressure is exerted by the fastener that will accurately indicate this pressure in a simple, easily understood manner as it is exerted on the connected elements and the threads of the fastener.

With the foregoing and other objects in mind, the invention contemplates indicating when a predetermined pressure has been exerted by a fastener as it is driven into a receiving element. According to certain aspects of the invention, a compressible washer having a surface marking is received on the fastener. This marking is normally covered by a covering member as the fastener is driven into the receiving element. As the fastener is tightened, the compressible washer is squeezed between the covering member and the receiving elements and the surface bearing the mark is forced to expand radially outward. The covering member is so designed and the marking is so positioned that as the compressible washer expands, the marking becomes visible only when a predetermined pressure has been exerted by the fastener.

According to certain more specific aspects of the invention, an incompressible washer is received adjacent to the head of a headed, threaded fastener, this washer having an eccentric aperture therethrough. A compressible washer is then placed adjacent to the incompressible washer, the compressible washer having concentric rings of different colors on the surface immediately adjacent to the incompressible washer. These rings are normally covered by the incompressible washer as the fastener is screwed into a receiving element. As the fastener is tightened in the receiving element, the compressible washer is squeezed between the incompressible washer and the surface bearing the rings, the connected members and is thereby forced to expand radially outward. The aperture is so positioned and the color rings are so arranged that, as the compressible washer expands, successive color rings become visible through the aperture indicating progressively greater predetermined pressures exerted by the fastener.

Other objects, advantages, and aspects of the invention will appear from the following detailed description of a specific embodiment thereof when taken in conjunction with the appended drawings in which:

FIG. 1 is an exploded perspective view of the pressure indicating device illustrating both the sequence of steps and the relative position of the parts in a preferred embodiment of the invention;

FIG. 2 is a central vertical section illustrating the parts in assembled positions with the compressible washer expanded radially outward to indicate pressure in accordance with the invention; and FIG. 3 is a plan view of the assembly illustrated in FIG. 2, showing concentric rings exposed through a notch as they would appear in the final step of the method.

Referring now in detail to the drawings and particularly to FIG. 1, there is illustrated an exploded view of one specific embodiment of the invention as it normally would be used. An incompressible washer 11, preferably fabricated of rigid metal, is placed on a headed, threaded fastener 12 adjacent to the head thereof. This incompressible washer 11 is provided with a notch 13 therethrough extending radially inward from the periphery thereof to a position radially outward of the head of the fastener, and is followed by a compressible washer 14, preferably of nylon or Teflon, placed adjacent to it on the fastener 12. The bores in both of the washers 11 and 14 are preferably closely fitted to the shank of the fastener 12.

A plurality of concentric rings 15—15 of different colors are provided on the surface 16 of the compressible washer 14 adjacent to the incompressible washer 11. These color rings 15—15 are normally covered by the incompressible washer 11 as the fastener 12 is then screwed into a receiving element 17. As the fastener is tightened in the receiving element 17, the compressible washer 14 is squeezed between the incompressible washer 11 and a member 18 to be connected to the receiving element 17 and the surface 16 is thereby forced to expand radially outward as shown in FIG. 2. The notch 13 is so positioned and the concentric color rings 15—15 are so arranged that, as the compressible washer 14 expands, successive color rings 15—15 become visible through the notch 13 as illustrated in FIG. 3. Each color ring 15 successively visible through the notch 13 is calibrated to indicate a progressively greater predetermined pressure exerted by the fastener 12.

The concentric color rings 15—15 are drawn so as to be indicative of a predetermined pressure when exposed through the notch 13, and a color code is established before the compressible washer 14 is ready for use. By using the color code to select the color ring corresponding to the desired pressure, an operator stops tightening the fastener when the selected color ring 15 appears through the notch 13. In this manner, a true indication of the pressure exerted on the connected elements and the threads of the fastener is attained. This is accomplished while the operator uses, not an elaborate torque wrench or machine, but merely a simple hand wrench for both screwing the fastener into the receiving element and tightening it to the desired pressure.

The concentric rings of different color 15—15 successively exposed through the notch 13 facilitate observance of the desired predetermined pressure by the operator as he is tightening the fastener, since the colored rings 15—15, in themselves strikingly visible, are contrasted with the edge of the notch 13 as they come into view. Because these rings 15—15 are easily observed as they become visible through the notch 13 and because the pressure indicated is that applied to the connected elements and the threads, an accurate indication is obtained.

While one specific embodiment of the invention has been described in detail hereinabove, it will be obvious that various modifications may be made from the specific details described without departing from the spirit and scope of the invention.

For example, while the eccentrically apertured incompressible washer 11 is preferred as the member which covers the compressible washer 14, other constructions and arrangements may be used such as employing a bolt head itself as the upper covering member. In this case, the bolt head would normally cover the markings on the compressible washer, and the markings would become visible one after the other beyond the periphery of such a bolt head. The covering member may either be placed loosely on the shaft of the fastener above the incompressible washer, as in the specific example shown in the drawing, or may be affixed to the fastener as described above with respect to the bolt head.

What is claimed is:

1. A device for automatically indicating the degree of tensioning of an elongated fastener, which comprises:
    a resilient washer arranged about the shank of the fastener and having a flat surface circumferentially continuous therearound, the continuous surface being provided with a marking thereon; and
    relatively rigid members freely abutting opposite sides of said washer while leaving the periphery of the washer unconfined for compressing said washer therebetween as the fastener is tightened to radially expand and move the surfaces of the washer along the abutting surfaces of said rigid members, the one of said members adjacent to the marked surface of said washer having a peripheral edge extending radially beyond the marking, said rigid members being related to the fastener shank to insure radial displacement of the resilient washer, whereby radial displacement of the marking past said peripheral edge may be detected, said marking on said washer being displaced past said peripheral edge when the fastener has been tightened to a preselected pressure.

2. A device for automatically indicating when a predetermined pressure has been exerted by a headed fastener as it is driven into a receiving element, which comprises:
    a resilient washer having an axial bore closely fitting a shank of the fastener and flat surfaces circumferentially continuous about the bore, one of the flat surfaces being provided with a marking thereon; and
    a relativley rigid washer having an axial bore closely fitting the shank of the fastener and at least one flat surface circumferentially continuous about the bore, said resilient washer being arranged about the fastener shank between said rigid washer and the receiving element with the marked surface thereof freely contacting the flat surface of said rigid washer and the other surface freely contacting the surface of the receiving element, said rigid washer and receiving element being spaced apart by the resilient washer to leave the periphery of the resilient washer free to radially expand, said rigid washer having a peripheral edge extending radially beyond the marking on said resilient washer, and said resilient washer being expandable radially outward of the fastener when compressed between the rigid washer and the receiving element as the fastener is tightened into the receiving element thereby to radially displace the marking past said peripheral edge, the marking being so located on said resilient washer as to move past said peripheral edge when the fastener has been tightened to a preselected pressure.

3. The device as recited in claim 2, wherein:
    the surface marking on the resilient washer is composed of concentric rings calibrated in terms of the pressure exerted by the fastener as each ring becomes visible radially beyond the peripheral edge of the rigid washer.

4. The device as recited in claim 2 wherein:
    the rigid washer is provided with an aperture disposed radially outward of the head of the fastener; and
    the surface marking on the resilient washer is composed of concentric rings normally disposed radially inward of the eccentric aperture in the rigid washer and calibrated in terms of the pressure exerted by the fastener as each ring becomes visible within the aperture.

5. A device for visually indicating the pressure exerted by a headed, threaded fastener as it is screwed into a receiving element, which comprises:
    a first annular circumferentially continuous member, fabricated of rigid metal, having a central aperture closely fitting the shank of the fastener through which said first member may be received on the fastener adjacent to the head thereof, and having a notch extending radially inward from the periphery thereof to a position radially outward of the head of the fastener;
    a second annular circumferentially continuous member, fabricated of a resilient plastic material, having a central aperture closely fitting the shank of the fastener through which said second member may be received on the fastener between said first member and the receiving element, and having concentric rings of different colors on the surface thereof adjacent to said first member which are so arranged that the color rings are not normally visible but so that the color rings become visible successively within the notch, due to radial expansion of said second member and resulting radial displacement of the rings thereon, when said second member is compressed between said first member and the receiving element as the fastener is tightened, the displacement of each color ring successively visible through the notch being calibrated relative to the notch to indicate progressively greater predetermined pressures exerted by the fastener.

6. A method of indicating the compression force applied by a bolt as it is screwed into a threaded aperture which comprises,
    forming concentric rings of contrasting colors on a surface of a radially deformable first washer, forming a slot in a rigid second washer extending from the periphery and terminating at a distance equal to the distance that the circumference of the outer ring is spaced from the center of the first washer, assembling the second washer and then the first washer on the shank of the bolt so that the second washer completely covers the concentric rings, inserting the bolt in the threaded aperture, and then screwing the bolt into the threaded aperture to compress and radially deform the first washer to move the concentric rings into view within the slot to indicate the compression force exerted by the bolt on the deformable washer.

References Cited in the file of this patent

UNITED STATES PATENTS

| | | |
|---|---|---|
| 1,994,388 | Ericksen | Mar. 12, 1935 |
| 2,413,797 | Stone | Jan. 7, 1947 |
| 2,464,152 | Ralston | Mar. 8, 1949 |
| 3,021,747 | Garrett | Feb. 20, 1962 |
| 3,060,731 | Adise | Oct. 30, 1962 |

FOREIGN PATENTS

| | | |
|---|---|---|
| 748,969 | Great Britain | May 16, 1956 |